(12) United States Patent
Lelievre et al.

(10) Patent No.: US 11,941,164 B2
(45) Date of Patent: Mar. 26, 2024

(54) METHOD AND APPARATUS FOR USER CONTROL OF AN APPLICATION AND CORRESPONDING DEVICE

(71) Applicant: InterDigital Madison Patent Holdings, SAS, Paris (FR)

(72) Inventors: Sylvain Lelievre, Montgermont (FR); Serge Defrance, Rennes (FR); Olivier Mocquard, Rennes (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 17/603,042

(22) PCT Filed: Mar. 20, 2020

(86) PCT No.: PCT/EP2020/057865
§ 371 (c)(1),
(2) Date: Oct. 12, 2021

(87) PCT Pub. No.: WO2020/212078
PCT Pub. Date: Oct. 22, 2020

(65) Prior Publication Data
US 2022/0187905 A1 Jun. 16, 2022

(30) Foreign Application Priority Data
Apr. 16, 2019 (EP) ..................................... 19305489

(51) Int. Cl.
*G06F 3/01* (2006.01)
(52) U.S. Cl.
CPC .............. *G06F 3/011* (2013.01); *G06F 3/017* (2013.01)

(58) Field of Classification Search
CPC ......... G06F 3/011; G06F 3/017; G06F 3/0304
See application file for complete search history.

(56) References Cited

U.S. PATENT DOCUMENTS 9,244,533 B2  1/2016  Friend et al.
9,261,987 B2  2/2016  Rounding et al.
(Continued)

FOREIGN PATENT DOCUMENTS

CN  102947777 A  2/2013
CN  107771339 A  3/2018
(Continued)

OTHER PUBLICATIONS

Tang et al., "VideoDraw: A Video Interface for Collaborative Drawing", CHI'90 Proceedings, Apr. 1990, pp. 313-320.
(Continued)

*Primary Examiner* — Grant Sitta
(74) *Attorney, Agent, or Firm* — Volpe Koenig

(57) ABSTRACT

The disclosure relates to a method, implemented in an electronic device adapted to be configured in a mono user mode, where the electronic device is controlled by input elements obtained from a single tracked user, and in a multi-user mode where the electronic device is controlled by input elements obtained from a group or one or more tracked users, the method comprising: —tracking actions of one or more user(s) selected amongst candidate users according to a current mode of the electronic device, and to selection requests of the candidate users, the selection requests being captured by at least one sensor coupled to said electronic device; —determining at least one input element adapted for controlling the electronic device according to the tracked actions. It also relates to corresponding device, electronic assembly, system, computer readable program product and storage medium.

15 Claims, 4 Drawing Sheets

(56) References Cited

U.S. PATENT DOCUMENTS

| | | | |
|---|---|---|---|
| 9,445,048 B1* | 9/2016 | Nariyawala | H04L 65/1083 |
| 10,025,390 B2 | 7/2018 | Hildreth et al. | |
| 2006/0182346 A1 | 8/2006 | Yoda et al. | |
| 2011/0154266 A1* | 6/2011 | Friend | G09B 19/00 |
| | | | 715/863 |
| 2012/0278729 A1 | 11/2012 | Vennelakanti et al. | |
| 2013/0050458 A1 | 2/2013 | Kim et al. | |
| 2014/0009378 A1 | 1/2014 | Chew | |
| 2014/0359651 A1 | 12/2014 | Lee et al. | |
| 2016/0094874 A1 | 3/2016 | Venkataraman et al. | |
| 2018/0367982 A1 | 12/2018 | Fogelson et al. | |

FOREIGN PATENT DOCUMENTS

| | | |
|---|---|---|
| CN | 109416580 A | 3/2019 |
| WO | 2011163011 A2 | 12/2011 |
| WO | 2016153647 A1 | 9/2016 |
| WO | 2018005051 A1 | 1/2018 |

OTHER PUBLICATIONS

Munaro et al., "A Feature-based Approach to People Re-Identification using Skeleton Keypoints", 2014 IEEE International Conference on Robotics & Automation (ICRA), Hong Kong, China, May 31, 2014, 8 pages.

Del Bimbo et al., "Multi-User Natural Interaction System based on Real-Time Hand Tracking and Gesture Recognition", 18th International Conference on Pattern Recognition (ICPR'06), Hong Kong, China, Aug. 20, 2006, 4 pages.

Blumrosen et al., "A Real-Time Kinect Signature-Based Patient Home Monitoring System," Sensors, vol. 16, No. 11, Nov. 23, 2016, 21 pages.

Ueng et al., "Vision Based Multi-User Human Computer Interaction", Multimedia Tools and Applications, Nov. 2015, 18 pages.

Angelini et al., "Multi-user Pointing and Gesture Interaction for Large Screen Using Infrared Emitters and Accelerometers", 14th International Conference on Human-Computer Interaction: Interaction Techniques and Environments, Orlando, Florida, USA, Jul. 9, 2011, 10 pages.

Bace et al., "Collocated Multi-user Gestural Interactions with Unmodified Wearable Devices: Augmenting Multi-User and Multi-Device Interactions with Proximity and Natural Gestures", Augmented Human Research, vol. 2, Article No. 6, Aug. 8, 2017, 14 pages.

Carter et al., "PathSync: Multi-User Gestural Interaction with Touchless Rhythmic Path Mimicry", 2016 CHI Conference on Human Factors in Computing Systems, San Jose, California, USA, May 7, 2016, 13 pages.

Anonymous, "Multi-User Multi-Touch Applications", Atracsys Interactive Solutions, https://www.salon-ecom.com/public/exposants_files/Multi-User_Multi-Touch_Guide_for_Professionnals.pdf, 2016, 24 pages.

* cited by examiner

METHOD AND APPARATUS FOR USER CONTROL OF AN APPLICATION AND CORRESPONDING DEVICE

This application claims the benefit, under 35 U.S.C. § 365 of International Application PCT/EP2020/057865, filed Mar. 20, 2020, which was published in accordance with PCT Article 21(2) on Oct. 22, 2020, in English, and which claims the benefit of European Patent Application No. 19305489.7, filed Apr. 16, 2019.

1. TECHNICAL FIELD

The present disclosure relates to the technical field of user control of electronic devices adapted to be used in a multi-user environment. Corresponding application, device, electronic assembly, system, computer readable program product and computer readable storage medium are described.

2. BACKGROUND

Many electronic devices can be coupled to user tracking means to acquire information regarding a user to obtain real-time information. In the present disclosure, user tracking means encompass for example sensors (wearable or not) that acquire information regarding a shape, a pose, a position and/or a motion of a user, or of one or more part of its body, like depth camera or colorimetry camera. Some of those electronic devices can also be controlled, at least partially, by users(s) according to the information acquired by the sensors. Indeed, tracking mechanisms help enabling a natural interaction experience at a user point of view. For instance, in the field of Virtual Reality (VR) or Augmented Reality (AR), tracking of a user's motion can allow a user to manipulate virtual objects of a virtual scene or to navigate in a 3D scene without using an auxiliary device (like a remote-control device).

However, user tracking in multi-user environments, like collaborative games or collaborative tools, can lead to some issues because the sensors on which the tracking rely can acquire information regarding several users concurrently.

Some solutions have proposed to take only into account actions performed simultaneously by all users, or to track only joined actions of users (like two users having overlapped hands in a 2-user environment). However, all these solutions do not permit a user to interact conveniently with an application in a multi-user environment.

So, there is need for a solution that enhance the user experience of an application at least partially controlled by user-tracking.

3. SUMMARY

The present principles address at least one of the above disadvantages to be resolved by proposing a method, implemented in an electronic device adapted to be configured in a mono user mode, where the electronic device is controlled at least partially by input elements obtained by tracking a single user, and in a multi-user mode where the electronic device is controlled at least partially by input elements obtained by tracking one or more users, a current mode of said electronic device and the at least one tracked user being selected according to at least one selection request, selection requests of candidate users being captured by at least one sensor coupled to said electronic device during a selection period of finite duration.

The present disclosure notably relates, according to some embodiments, to a method, implemented in an electronic device adapted to be configured in a mono user mode, where the electronic device is controlled by input elements obtained from a single tracked user, and in a multi-user mode where the electronic device is controlled by input elements obtained from a group or one or more tracked users, the method comprising:
tracking actions of at least one user, the at least one tracked user being selected amongst candidate users according to a current mode of said electronic device, and to selection requests of said candidate users, said selection requests being captured by at least one sensor coupled to said electronic device;
determining at least one input element adapted for controlling said electronic device according to said tracked actions.

According to another aspect, the present disclosure also concerns an electronic device adapted to be configured in a mono user mode, where the electronic device is controlled at least partially by input elements obtained by tracking a single user, and in a multi-user mode where the electronic device is controlled at least partially by input elements obtained by tracking one or more users, the electronic device comprising at least one processor adapted for:
selecting a current mode of said electronic device and the at least one tracked user according to at least one selection request, selection requests of candidate users being captured by at least one sensor coupled to said electronic device during a selection period of finite duration. The present disclosure notably relates, according to some embodiments, to an electronic device adapted to be configured in a mono user mode, where the electronic device is controlled by input elements obtained from a single tracked user, and in a multi-user mode where the electronic device is controlled by input elements obtained from a group or one or more tracked users, the electronic device comprising at least one processor adapted for:
tracking actions of at least one user, the at least one tracked user being selected amongst candidate users according to a current mode of said electronic device, and to selection requests of said candidate users, said selection requests being captured by at least one sensor coupled to said electronic device;
determining at least one input element adapted for controlling said electronic device according to said tracked actions.

4. BRIEF DESCRIPTION OF THE DRAWINGS

The present disclosure can be better understood, and other specific features and advantages can emerge upon reading the following description, the description referring to the annexed drawings wherein.

Figure 1:
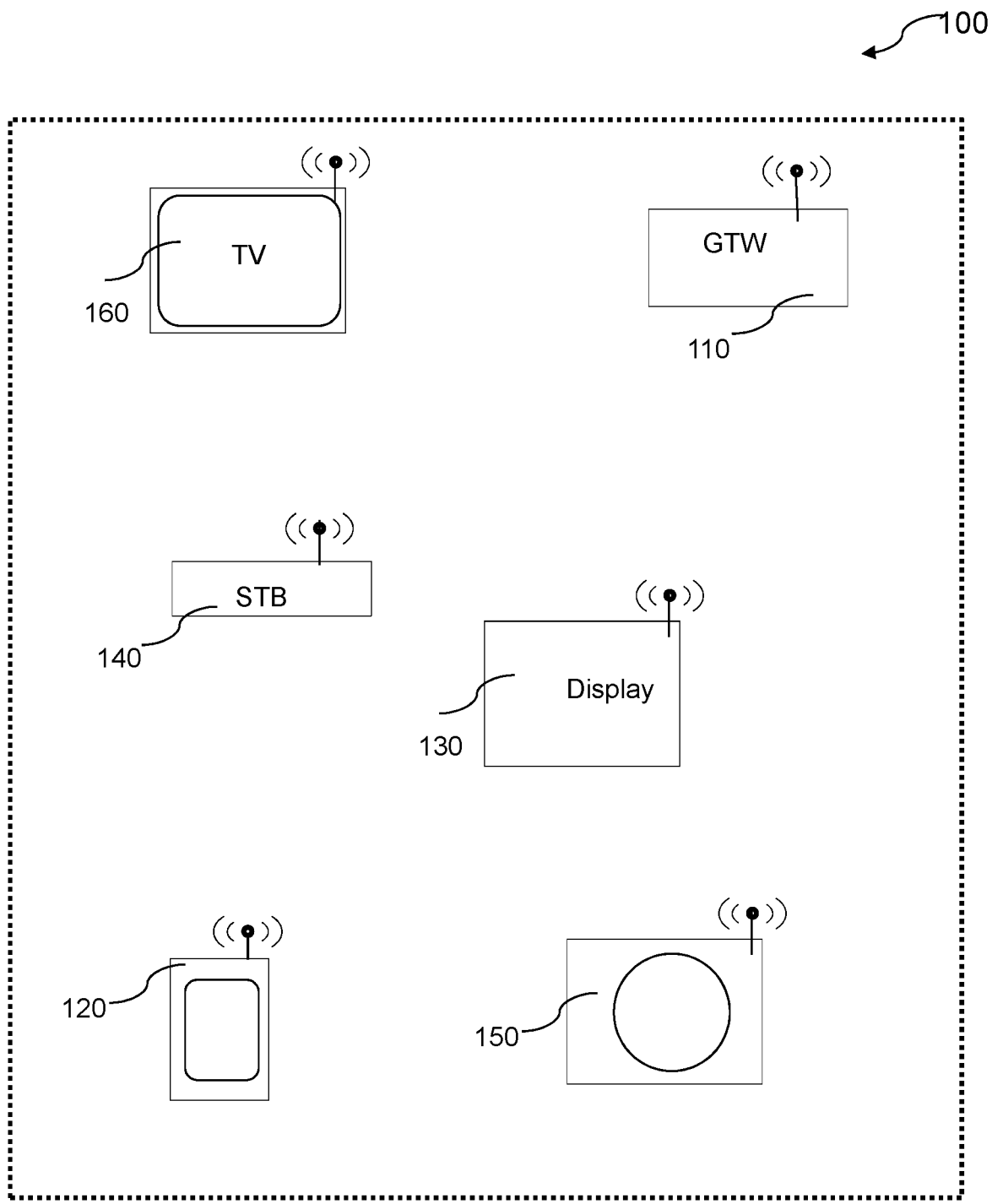
FIG. 1 shows an example of a tracking system according to an exemplary embodiment of the present disclosure.

It is to be noted that the drawings illustrate example embodiments and that the embodiments of the present disclosure are not limited to the illustrated embodiments. For example, as obvious for the one of skill in the art, embodiments of the present disclosure can also be implemented in a more complex tracking system than the one illustrated by FIGS. 1 to 6.

5. DETAILED DESCRIPTION OF THE EMBODIMENTS

The present disclosure relates to the technical field of electronic device, or corresponding application or method, adapted to be at least partially controlled via at least one physical action of one or more users (like concurrent users), the at least one physical action being captured by one or more sensing device(s) (or sensor(s)) coupled with the electronic device and triggering a processing by the electronic device. Such a physical action can be a gesture, or sequence of gestures, a sound or a sequence of sounds produced by the one or more user(s), or a combination thereof for instance.

In distinction to prior art solutions, at least some embodiments of the present disclosure can permit to choose between a multi-users mode and a single user mode and to select dynamically user(s) that will interact with the system and thus that will be tracked.

The Term "processing" is herein to be understood in its larger scope and encompass one or more diverse operation and for example modifying a rendering of a content on a display device coupled to the electronic device, like a display of a TV set for instance. The rendering of a content can differ depending on the nature of the content and can comprise for instance displaying a visual part of the content or playing an audio part of the content. By "visual part" it is to be understand a video, one or more sequence of images, and/or one or more still images, or a composition thereof.

In the example use case where the electronic device is adapted to process a VR or an AR content including at least one virtual object or scene, the processing triggered by an action of the user can for example initiate and/or modify a rendering of such a virtual object or scene.

In at least one embodiment of the disclosure, the electronic device can be configured either in a "mono user" (or "single user") mode where only the actions of a single user are tracked, or in a "multi-user" (or "multiple users") mode where action of several users can be tracked, and for example where several actions of several users can be tracked concurrently.

In a mono-user mode, only one person at a time can control the interaction. For example, in some embodiments, once a user is selected for controlling the application, no other user can interfere. Such an embodiment can for instance permit a single user to navigate in a 3D scene and/or to alter the rendering of the scene consequently, the other person(s) being at a vicinity of the selected user being only permitted to watch the 3D scene without altering it.

In a multi-user mode, two or more users can interact concurrently with the electronic device. Such an embodiment can be for instance adapted to use cases where the electronic device is executing collaborative applications, like a game, e.g. a kind of 3D puzzle where players are considered as a team that must collaborate together to reach a common goal (like putting together elements to form an object or painting a shared object or scene). The multi-user mode can also be adapted to situation where several users can act independently (or almost independently), like when different users are manipulating different objects of a same VR or AR scene.

FIG. 1 illustrates a tracking system 100 comprising one or more electronic devices adapted to implement at least one embodiment of the present disclosure.

In the embodiment of FIG. 1, the tracking system 100 is located in a domestic environment. Some of the electronic devices of the system can exchange data inside a communication network, for instance a local area network (LAN), thanks to wired communication interfaces (like Ethernet interface) or wireless communication interfaces, like WIFI® or Bluetooth® interfaces.

The tracking system can for example comprise one or several gateway(s) 110, providing access to at least one other communication network, like a Wide Area Network (WAN). For example, the gateway (GTW) 110 can provide access to a Broadcast Network or to a Broadband Network, like the Internet Network. For instance, GTW 110 can receive data from the broadcast network or receive and/or transmit data from/to the broadband network. Thus, at least some of the electronic devices of the system 100 can receive and/or transmit data, for example audiovisual data, via the gateway 110, from/to those other communication networks.

The tracking system 100 can also include at least one other electronic device adapted to process (and for example render) an audio and/or visual signal. Such electronic device can include a Set Top Box (STB) 140, a tablet 120, a PC, a smartphone, a Blue-ray player, a TV Set 160, an audio speaker 150 and/or a display 130. All those exemplary devices can be connected wirelessly or by a wired connection to the GTW 110.

Figure 2:
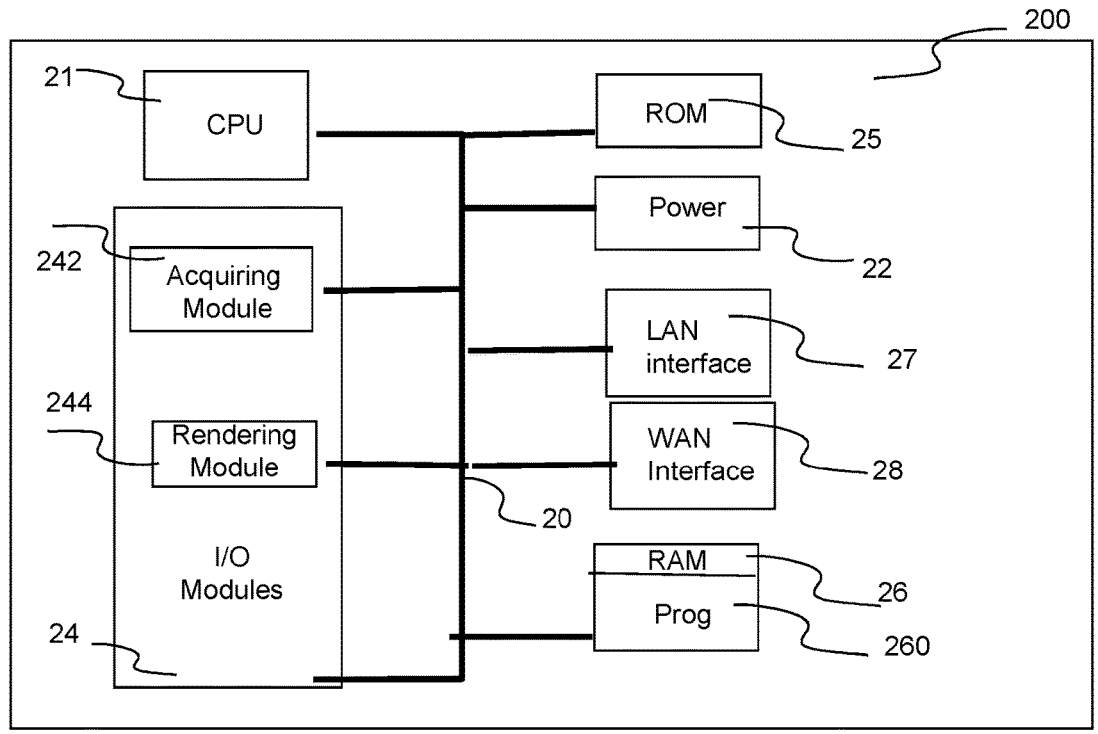
FIG. 2 illustrates an example functional structure of an electronic device adapted to implement at least some of the embodiments of the method of the present disclosure.
Figure 3:
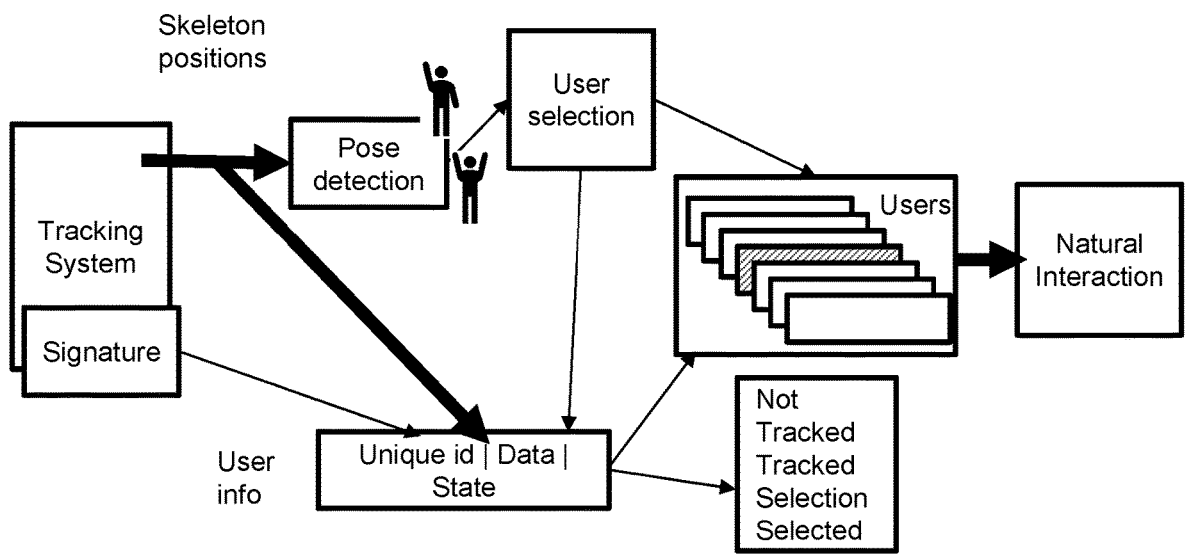
FIG. 3 depicts an example overview of user interactions with the tracking system in at least some embodiments the present disclosure.

FIG. 2 describes an example functional structure of an electronic device 200 where the application may be implemented. The electronic device 200 may be for example adapted to implement the method 600 of the present disclosure, that is described later, in at least some of its embodiments. The electronic device can be for instance one of the exemplary electronic devices introduced above in link with FIG. 1. It is to be pointed out that the elements, or module, or blocks, of the functional structure illustrated of FIG. 2 can be implemented thanks to software components of the electronic device 200 and/or thanks to hardware components of the electronic device 200. At least some elements illustrated by FIG. 2 can include both at least one software component and at least one hardware component of the processing device 200. Several of those elements can be part of a same physical apparatus or can belong to different, separate, physical apparatus, depending upon embodiments.

In the example embodiment of FIG. 2, the electronic device 200 can include different devices (or modules), linked together via a communication bus 20, such as a control, data and address bus, which can also carry a timer signal. For instance, it can include one or several microprocessors 21 (or Central Processing Units (CPU)), a ROM (or «Read Only Memory») 25, a RAM (or «Random Access Memory») 26 and wired and/or wireless communication interface(s) 27, 28, providing access to a LAN and/or WAN Network. For instance, at least one of communication interfaces 27, 28 of the electronic device 200 can be adapted to receive one or more audio and/or video content or stream.

In the example embodiment of FIG. 2, the electronic device 200 can further include at least one Input/Output (I/O) module 24, (like a tactile display, a switch, a led, a button, and so on). For example, the electronic device can comprise (or more generally be coupled to) at least one acquiring module 242 adapted to detect a user physical action, like an audio and/or video acquiring device, such as a camera, a microphone, and/or a position and/or motion tracking device (like a GPS module, a rotational mouse, a gyroscope, an accelerometer).

In the example embodiment of FIG. 2, the one or more acquiring module(s) are adapted to detect a pose of a user and to detect motion of a user, like hand motion.

In the illustrated embodiment, the electronic device can comprise (or more generally be coupled to) at a content rendering module 244, like a TV Set or a tablet, adapted to render an audio and/or visual content in one or more format(s). The content rendering module can include a display and/or a speaker. This content rendering unit can be optional in some embodiments.

Each of the mentioned memories can include at least one register, that is to say a memory zone of low capacity (a few binary data) or high capacity (with a capability of storage of a whole program or of all or part of data representative of data to be calculated or displayed).

When the electronic device 200 is powered on, via a power supply module 22, for instance a power supply module connected to the power line network, the at least one microprocessor 21 loads the program instructions 260 in a register of the RAM 26, for example the processes needed for performing at least one embodiment of the method 600 described hereinafter and executes the program instructions.

The electronic device 200 of the system can be adapted to implement the method 600 of the present disclosure, in any of its embodiments. In the example embodiment illustrated in FIG. 2, the electronic device is adapted to be configured in a mono user mode, where the electronic device is controlled at least partially by input elements obtained by tracking a single user, and in a multi-user mode where the electronic device is controlled at least partially by input elements obtained by tracking one or more users, and the microprocessor 21 can be configured for:

selecting a current mode of said electronic device and the at least one tracked user according to at least one selection request, selection requests of candidate users being captured by at least one sensor coupled to said electronic device during a selection period of finite duration.

In some embodiments, the microprocessor 21 can be configured for:

tracking physical actions of at least one user, the at least one tracked user being selected amongst candidate users according to a current mode of said electronic device, and to selection requests of said candidate users, said selection requests being captured by at least one sensor coupled to said electronic device;

determining at least one input element adapted for controlling said electronic device according to said tracked physical actions.

The structure depicted in link with FIG. 2 has only an example purpose. It is to be pointed out that the electronic device 200 can further include additional capabilities even if illustrated as provided by separate devices. Furthermore, at least some embodiments of the present disclosure can be at least partially implemented in at least one electronic device externally coupled to another device.

Figure 4:
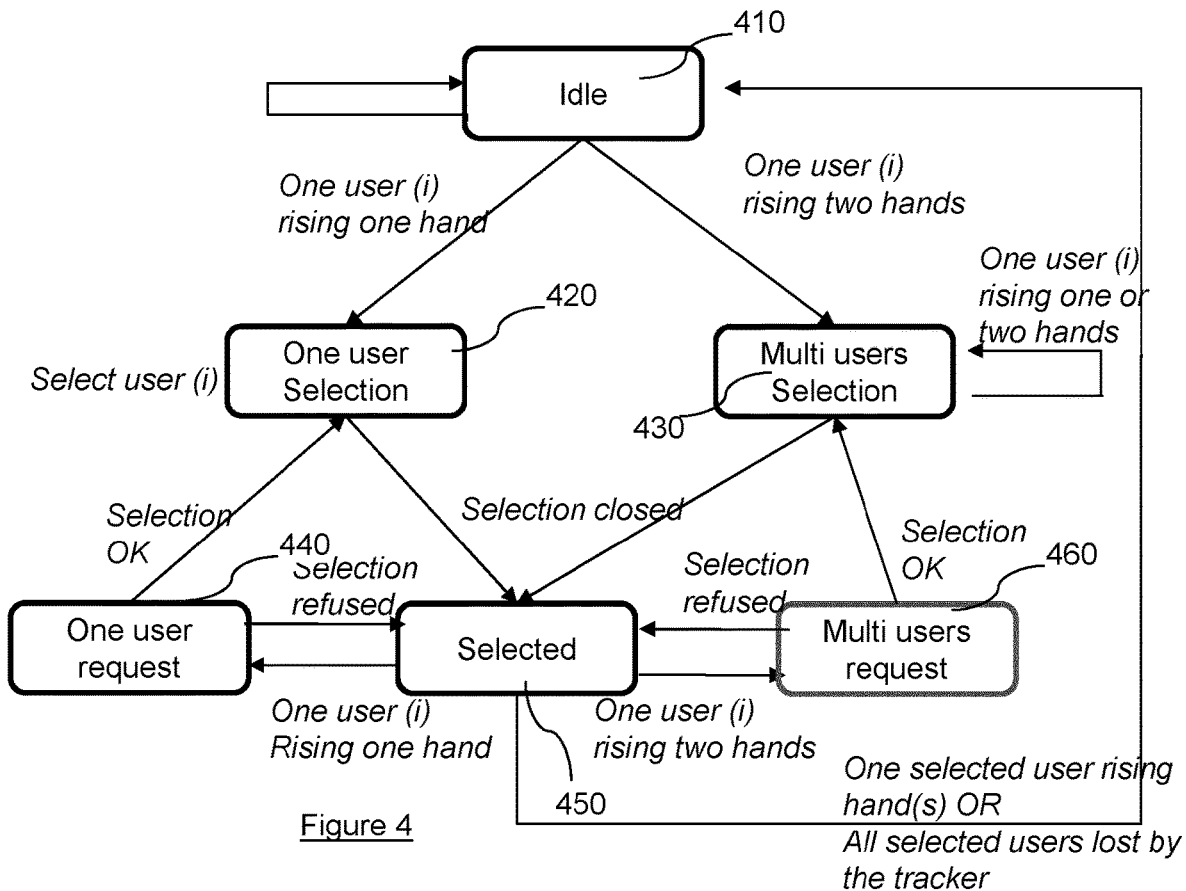
FIG. 4 illustrates a state machine of an example selection mechanism that can used when implementing some of the embodiments of the method of the present disclosure.
Figure 5:
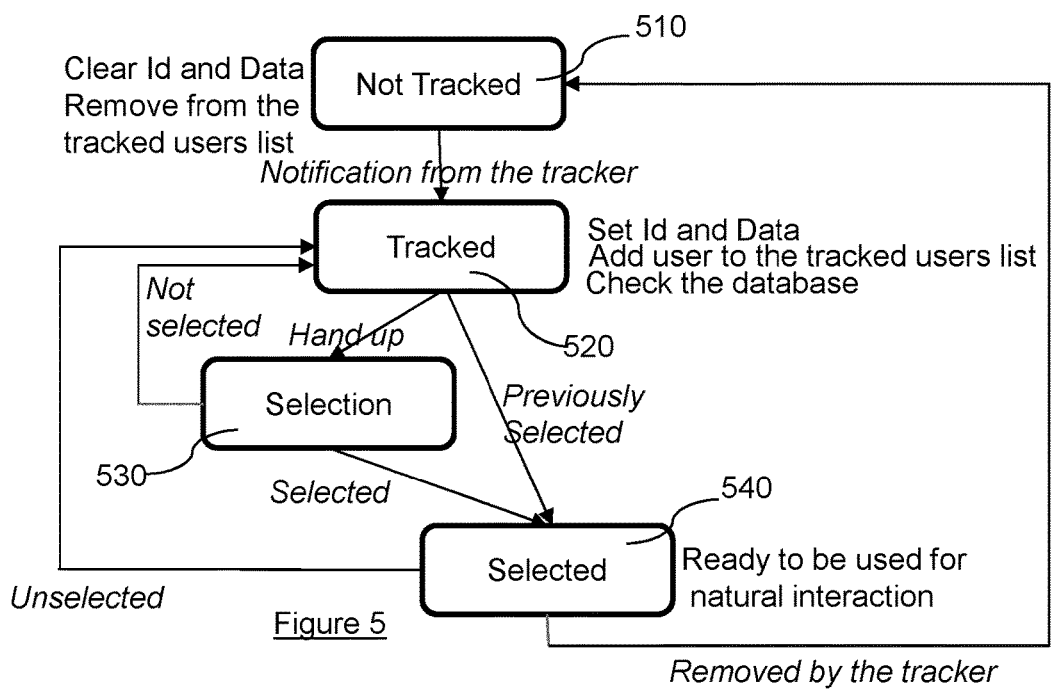
FIG. 5 illustrates a state machine of an example user state diagram that can used when implementing some of the embodiments of the method of the present disclosure.
Figure 6:
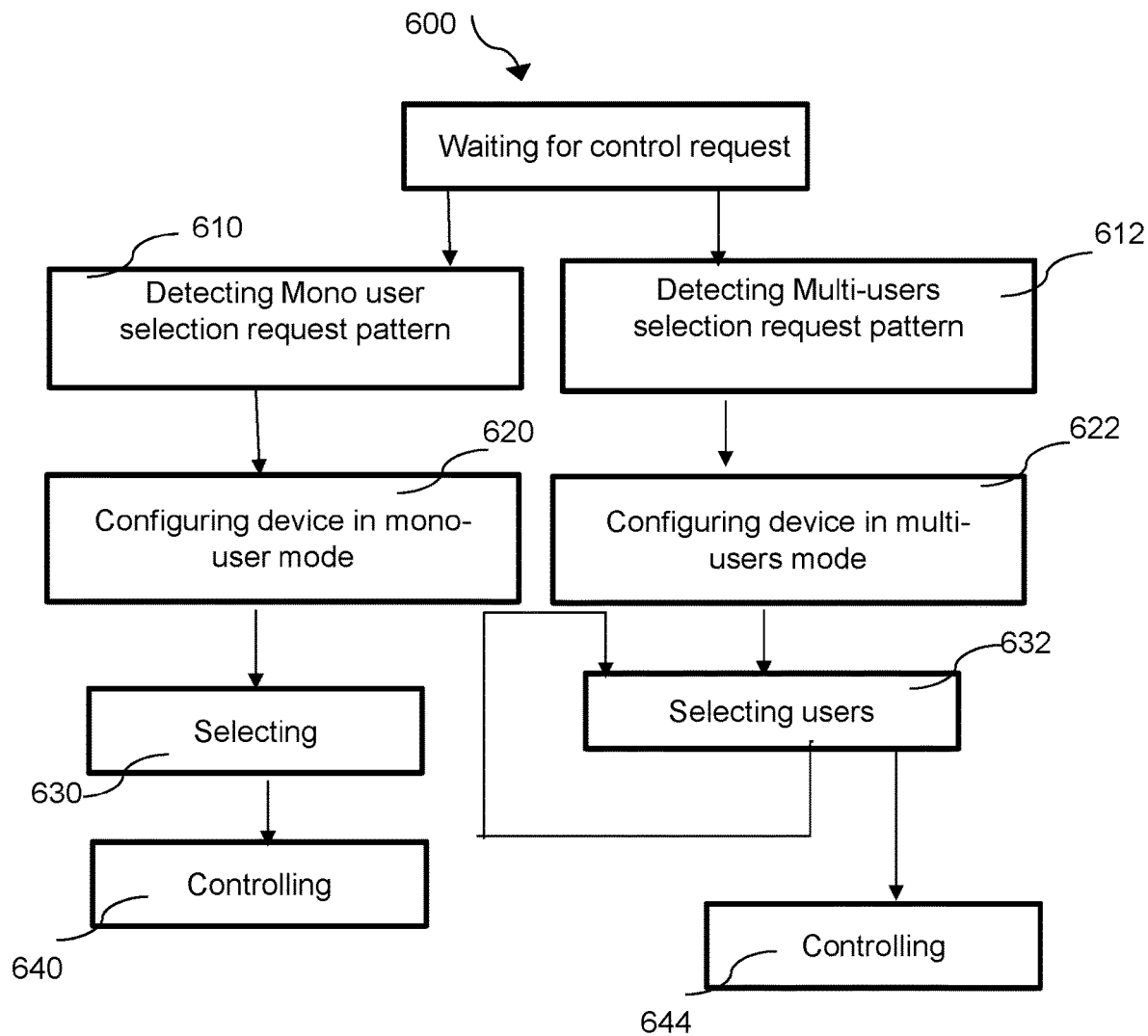
FIG. 6 depicts an overview of some example embodiment of the method of the present disclosure.

An example embodiment of the method 600 of the present disclosure is detailed hereinafter with regard to FIGS. 4, 5 and 6. FIG. 6 shows an overview of the example embodiment of the method 600, FIG. 4 illustrates a state-machine adapted to be used by the method for selecting the one or more user(s) authorized to control the electronic device and FIG. 5 illustrates the tracking state of a user while staying in a sensing zone of the tracking system. In the example embodiment that is illustrated, the method is implemented in a software application executing in the device 200 of FIG. 2. The software application can be launched at the powering up of the electronic device 200, or at a later stage.

In the detailed embodiment, the electronic device can be configured in a mono-user mode or in a multi-user mode. The mono-user mode and the multi-user mode are associated respectively with a first and a second action pattern, that correspond respectively to one or more actions that can be captured by the at least one sensor of the tracking system. The detection of the first and second action pattern is interpreted respectively as a user request for being selected for controlling the electronic device and for configuring the device in the corresponding mode. The corresponding detected user action will be referred to hereinafter as a "selection request" (more precisely a mono-user selection request or a multi-users selection request depending on the action pattern).

In the example embodiment of FIGS. 4 and 5, the first and second action pattern are registered gesture patterns, for instance the first action pattern correspond to a "one hand rising" while the second action pattern corresponds to a "two hands rising" and the detected action pattern is a "arm up" pose.

At the launching of the application, or when no user is present in the acquiring zone of the sensors, the device is not yet controlled by a given user and is thus configured in a default mode. In some embodiments, the default mode can be the mono-user mode or the multi-user mode (with default user(s) selected for controlling the electronic device for instance, like the first user detected by the tracking module of the electronic device once the application is launched, or the user being currently the closest user to the electronic device). In other embodiments, the default mode can be another mode, like an "idle" (or "waiting for control request") mode as illustrated by FIG. 4 (Idle State 410). In the example embodiment of FIGS. 4 and 6, the electronic device stays in the "idle" mode until an action is detected that corresponds a first and/or second action pattern. When the first action pattern is detected 610 while the device is configured in the "idle" mode, the method includes configuring 620 the electronic device in the "mono-user mode (One-user selection State 420)". The user at the origin of the detected action is selected 630 for being the single user controlling the application and the method includes tracking the actions performed by the selected user in order to detect events to be used as input elements for controlling 640 the device.

Similarly, when the second action pattern is detected 612 while the device is configured in the "idle" mode (Idle State 410), the method includes configuring 622 the electronic device in the "multi-user mode" (Multi-users selection State 430). As illustrated by FIG. 6, the method includes constituting a group of users authorized to control the device by selecting 630 users. More precisely, the user that is the origin of the detected action corresponding to the first, respectively the second, action pattern, is selected as belonging to the group at the time where the device is configured in the mono-user, respectively the multi-user mode.

In the multi-user mode, other users can be added to the group later. In the illustrated embodiment of FIGS. 4 and 6, the selecting 630 is performed during a limited period of time. For instance, the selection period can begin at the time where the device is configured in the multi-user mode (Multi-users selection State 430). Depending upon embodiments, the selection period can be a period of a given duration, like a constant duration, the period ending (Selected State 450) when a timer initiated at the beginning of the selection period with an amount of time reached its end (or zero value) for instance (or in other words when an amount of time set on a timer at the beginning of the selection period is elapsed), or the selection period can be a period of variable duration ended by a specific action on the device, like a specific action of a user (e.g. an already selected user or a user acting as a supervisor), or when a given number of users is currently selected (like a maximum number of simultaneously selected users). The specific action can correspond to a given action pattern known from the electronic device for instance. Depending upon embodiments, the given action pattern can be the first action pattern, the second action pattern and/or an action pattern different from the first and/or second action pattern. Similarly, the selection period can begin upon a specific event (like a selection of a first user, or an order of a supervisor user, or an automatic event triggered by a timer, by a specific state of the electronic device and/or by a software application executing on the electronic device).

During the selection period, in the multi-users mode (Multi-user selection State 430), when a selection request (Multi-users request State 460) (being either a mono-user selection request or a multi-users selection request) is performed by a user not belonging to the group of selected users, the at least one other user is selected and added to the group of users that control the application. In the example embodiment illustrated by FIGS. 4 and 5, when performed during the selection period, the selection of further users is not limited by a confirmation (like an approval), or subject to a refusal, of an already selected user (or in other terms a member of the group of selected users). In other embodiments, at the opposite, selecting a further user can be conditional, depending on a confirmation, or a refusal, of at least one already selected user. Depending upon embodiments, the confirmation and/or the refusal of the at least one already selected user can be either explicit or implicit. For instance, a specific action pattern can be requested for the confirmation (respectively the refusal) and the absence of occurring of the specific action pattern can be interpreted by the electronic device as a refusal (respectively a confirmation) of the at least one already selected user. Depending upon embodiments, the specific action pattern can be the first action pattern, the second action pattern and/or an action pattern different from the first and/or second action pattern.

Depending upon embodiments, once the selection period has ended (Selected State 450), no other user can be selected, or the selection of a further user can be restricted, similarly to what has been described above in regard of the not ended selection period. For instance, according to FIGS. 4 and 5, once the selection period has ended in the multi user mode, when a selection request (Multi-users request State 460) performed by a further user, not belonging to the group of selected users, is detected, the processing of the request can be postponed during a given time period. The selection request of the further user can be ignored if a specific action pattern (the first and/or second pattern in the example embodiment), originating from a user of the group of users controlling the application, and corresponding to a refusal, is detected during the given period of time. If no other specific action pattern (considered as representative of a refusal for instance) originating from the group of users already controlling the application is detected during the given period of time, the selection request of the further user can be taken into account. For instance, if the selection request of the further user is a mono-user selection request (One user request State 440) (the first pattern being detected), the method can comprise configuring the electronic device in the mono-user mode (One user selection State 420), the further user being selected for being the single user controlling the application in the mono-user mode. If the selection request of the further user is a multi-user selection request (the second pattern being detected), the method can comprise iterating the constituting of the group of users for controlling the application, the user(s) previously part of the group of users previously controlling the application being removed from the group (in other words deselected). More precisely, a new group of users can be constituted for controlling the application, the new group comprising the "further" user and other members being added during a selecting period similarly to what has already been described.

The selecting performed in the mono-user mode can similarly depend on whether a selection period has ended or not. However, in the mono-user mode (One user selection State 420), the selection period can be considered as ended (Selected 450) as soon as a single user is selected. Thus, when a mono-user selection request (One user request State 440) is detected from a user other than the one currently selected for controlling the device, the processing of the selection request can be postponed during a given time period (that might be a same or a different period of time compared to the postponing time period of the multi-user mode introduced above). This period of time can be obtained for instance via a configuration file of the application (and can be chosen by a provider of the application or by one of its user). For instance, similar to what has been described about the multi-user mode, the selection request of the other user can be ignored according to a confirmation or a refusal of the already selected single user during the given period of time. For example, the selection request of the other user can be ignored if another specific action pattern (considered as representative of a refusal for instance) originating from the single user already selected for controlling the application is detected. if no further action pattern originating from the already selected single user is detected during this period of time, the device can stay in the mono-user mode, the other user at the origin of the selection request being newly selected as the single user controlling the application.

In some embodiments, if one of the currently selected user(s) performed a selection request when no further selection request of a further user action is being processed or postponed, the selection request can be ignored. In other embodiments, the first and/or second pattern can be used as other input elements once a user is already selected. For instance, the first and/or second pattern can be used as a confirmation or a refusal of an already selected user for being unselected or a request of a member of the group of selected users for unselecting all users that are currently selected for controlling the application. In a variant, a third pattern can be associated to the idle (or "waiting for control request") mode. In such an embodiment, the method can comprise configuring the device in the "idle" mode when an action is detected that corresponds to the third pattern (thus being considered as a request for deselecting the currently selected user(s)). The application can also return in the idle or "waiting for control" mode automatically when no user is present is the area sensed by the sensors.

It is to be pointed out that the method can also comprise applying some rules or outputting some recommendations in order to avoid (or solve) some issues. For instance, if several selection requests are detected at the same time, all selection requests can be ignored, a visual and/or audio message being output on a user interface) or only one of the selection requests (chosen according to user's priorities, or by default or randomly for instance) can be accepted.

As shown above, at least some of the embodiments of the present disclosure can thus help one or several users to interact more conveniently together, compared to some prior art solutions, for example when selecting the user(s) to control the electronic device (and/or when being requested to assign control to another user than the one already selected).

The above detailed embodiments comprise tracking physical actions of one or more users (for instance users being in the vicinity of the electronic device, like users facing the display (in embodiments involving a display of an AR and/or VR scene), or users being front of the TV set (when the electronic device 200 is a TV set).

Depending upon embodiments, tracking can be operated via different tracking means. For instance, the tracking means of the electronic device 200 can include an acquiring module 242 including at last one wearable sensor (like a cloth or device) adapted to provide its position (or geographical localization) to the electronic device, or at least one camera, like a Color and/or Depth camera adapted to at least partially reconstruct a human body skeleton.

As illustrated by FIG. 5, the tracking can provide for instance a list of detected users, each of the detected user being associated by a unique Identifier.

In some embodiments, for instance in embodiments where a user is automatically deselected (Not tracked State 510) when leaving the scene covered by the tracking devices, a user can be assigned a different unique identifier upon the time. Notably the unique identifier assigned to a user can vary when it leaves and then re-enters the scene covered by the tracking devices. In other embodiments, a user can be assigned the same identifier (also called a signature of the user) upon the time, and notably when leaving and then re-entering the scene. This identifier, or signature, can be associated for instance to at least one sensor wore by a user. The signature can also be based on at least a part of the user's skeleton (the joints of the skeleton part being used to calculate a signature for instance) or the user's face (with facial recognitions technics for instance). Such a signature can be obtained via a dedicated software and/or hardware module coupled to the electronic device for instance.

In some embodiments, the tracking can comprise, when a new user is detected (tracked State 520) during the tracking, comparing its signature with the user signatures already known by the tracking system (for instance the signatures being part of information already stored regarding some users). If the signature is already present, the stored user information will be updated with the data provided by the tracking. Otherwise, a new user's information is created.

In order to differentiate users, the method can comprise storing and accessing information regarding at least one user detected by the sensor(s), like selected users (selected State 540) and tracked users (tracked State 520), in a storage module (like a database) of the electronic device.

The information regarding one user can include:
- an identifier of the user (like an identifier assigned by the tracking, thanks a user tracking module for instance, or given by a signature module), and uniquely identifying a user (like an identifier valid only while the user is tracked, or an identifier kept unchanged during several tracking with at least one interruption period);
- a set of data, given by a user tracker module and containing the joints position of at least a part of the user skeleton. It is updated at each frame or at another frequency depending of the tracker.
- a selection and/or tracking indicator, representative of the current selection state of the user (as illustrated by FIGS. 4 and 5).

The tracking can also comprise analyzing physical actions of user(s) in order to recognize a pose pattern known by the tracking system (like the first, second and/or third pattern already introduced). The analyzing can comprise analyzing, via a natural interaction module for instance, the gesture and/or words of a user and/or analyzing, via a pose detection module for instance, a pose of a tracked user, or a pose of a part of a user (like a position of its hands and/or its head) For instance, in the example embodiments of FIGS. 3, 4 and 5, the pose detection module can be adapted to detect 2 or 3 poses: One arm up (being either the left and/or right hand), higher than the head, and two arms up. In some embodiments, the method can require a pose to be kept for a duration, like a few seconds (e.g. 2, 3, 4 seconds), to be validated.

Depending upon embodiments, and for example depending whether a detected user is a selected user or not, the whole human body of a user can be tracked, or the tracking can be limited to only a part of a user's human body, like parts of a skeleton of a user. Such embodiments can thus help the saving processing cost involved by the tracking for the tracking system. For instance, in embodiments where the tracking device(s) include a camera, the tracking can be to reduced visual zones around detected users (tracked State 520) and/or selected users (selected State 540), (the whole scene being tracked only when no user is selected) or around a part of users, like hands of users. In the exemplary embodiments of FIGS. 3, 4 and 5, the tracking can be limited to arms of users, or 3D positions of user's hands, or can be performed only for 3D positions of user's hands and the user head. It is to be pointed out that actions of non-selected users can be tracked only for detecting a selection request (Selection state 530 (and thus for detecting some specific action patterns), while actions of a selected user can be tracked to detect input elements for controlling 640 the electronic device. Thus, different action patterns can be tracked for an already selected user than for a non-yet selected user. Consequently, the tracking can differ upon the "selection state" (with reference to FIG. 5) of a user.

In some embodiments, all information regarding a user lost by the tracking means (or in other words, being no more detected by the sensors) can be deleted from the database. In other embodiments, at least part of the information regarding a user lost by the tracking means can be kept at least temporary by the tracking system. For instance, in some embodiments, in some situations a user can be considered as likely to be detected again soon and thus its information are kept for a non-null duration (for instance for a duration being less than 5, 10, or 20 minutes) by the tracking system. If the user was selected before being lost, it will keep this state when it comes back. In embodiments where the tracking device(s) include a RGBD camera, if a user disappears while the last position of the tracked part of its skeleton is close to the center of the camera field of view, for example, the user can be assumed to reappear soon, as the camera can have lost the user due to an overlapping issue. Also, the tracking of a user (controlling of the electronic device) may be interfered by the presence of other users moving near and around him/her, leading to a total or partial occlusion of the tracked user.

The present disclosure is described in relation with example sensors, like wearable sensor(s), camera, microphone(s), gyroscope(s), accelerometer(s) or Global Positioning System (GPS) module. Of course, as it can be understandable by a person skilled in the art, the present disclosure can also be applied to a tracking system using other tracking devices than the ones cited in the present disclosure.

As can be appreciated by one skilled in the art, aspects of the present principles can be embodied as a system, device, method, signal or computer readable product or medium.

For example, the present disclosure relates to a method implemented in an electronic device adapted to be configured in a mono user mode, where the electronic device is controlled by input elements obtained from a single tracked user, and in a multi-user mode where the electronic device is controlled by input elements obtained from a group or one or more tracked users, the method comprising:

tracking actions of at least one user, the at least one tracked user being selected amongst candidate users according to a current mode of said electronic device, and to selection requests of said candidate users, said selection requests being captured by at least one sensor coupled to said electronic device;

determining at least one input element adapted for controlling said electronic device according to said tracked actions.

According to at least one embodiment of the present disclosure, the method comprises altering a rendering of a virtual scene output on a rendering device coupled to said electronic device according to said determined input element.

According to at least one embodiment of the present disclosure, said selection requests are identified as requests for configuring said electronic device in said mono-user mode or as requests for configuring said electronic device in said multi-user mode by taking account respectively of a similarity criterion between a first action pattern associated to said mono user mode and a second action pattern associated to said multi user mode.

According to at least one embodiment of the present disclosure, the method comprises, upon receiving a selection request of a candidate user when said electronic device is configured in said mono-user mode, a first user being currently selected as said single tracked user, selecting said candidate user for being tracked, instead of said first user, said selecting being performed according to a confirmation of said first user.

According to at least one embodiment of the present disclosure, the method comprises, during a selection period, upon receiving a selecting request of a candidate user for configuring said electronic device in said mono-user mode, when said electronic device is already configured in said multi-users mode, configuring said electronic device in said mono-user mode and selecting said candidate user for being said single tracked user.

According to at least one embodiment of the present disclosure, said selection period ends after a finite period of time.

According to at least one embodiment of the present disclosure, the method comprises during said selection period, upon receiving a selecting request of a candidate user for configuring said electronic device in said multi-users mode, when said electronic device is already configured in said multi-users mode, adding said candidate user to said group of tracked users requests.

According to at least one embodiment of the present disclosure, the method comprises, ending said selection period upon capturing at least one ending order of at least one first user of said group of tracked users.

According to at least one embodiment of the present disclosure, said order is identified by taking account of an occurrence of a third action pattern in said tracked actions of said first user.

According to at least one embodiment of the present disclosure, the method comprises, upon receiving a selecting request of a candidate user for configuring said electronic device in said multi-users mode, when said electronic device is configured in said multi-user mode and said selection period has ended, adding said candidate user in said selected tracked users according to a confirmation of a first user of said group of tracked users.

According to at least one embodiment of the present disclosure, the method comprises, upon receiving a selecting request of a candidate user for configuring said electronic device in said mono-user mode, when said electronic device is configured in said multi-user mode and said selection period has ended, configuring said electronic device in said mono-user mode and selecting said candidate user for being said single tracked user according to a confirmation of a first user of said group of tracked users.

According to at least one embodiment of the present disclosure, said confirmation is identified by taking account of an occurrence of a fourth action pattern in said tracked actions of said first user.

According to at least one embodiment of the present disclosure, the method comprises determining a signature uniquely identifying one of said tracked users.

Also, the present disclosure relates to a method, implemented in an electronic device adapted to be configured in a mono user mode, where the electronic device is controlled at least partially by input elements obtained by tracking a single user, and in a multi-user mode where the electronic device is controlled at least partially by input elements obtained by tracking one or more users, a current mode of said electronic device and the at least one tracked user being selected according to at least one selection request, selection requests of candidate users being captured by at least one sensor coupled to said electronic device during a selection period of finite duration.

According to at least one embodiment of the present disclosure, the method can comprise altering a rendering of a virtual scene output on a rendering device coupled to said electronic device according to said obtained at least one input element.

According to at least one embodiment of the present disclosure, said selection requests are identified as requests for configuring said electronic device in said mono-user mode or as requests for configuring said electronic device in said multi-user mode by taking account respectively of a similarity criterion between a first action pattern associated to said mono user mode and a second action pattern associated to said multi user mode.

According to at least one embodiment of the present disclosure, the method comprises ending said selection period upon selecting a first user for controlling said electronic device when said electronic device is in said mono-user mode.

According to at least one embodiment of the present disclosure, the method comprises, upon receiving a selection request of a candidate user when said electronic device is configured in said mono-user mode and controlled by tracking a first user, selecting said candidate user for being tracked for controlling said electronic device, instead of said first user, said selecting being performed according to a confirmation and/or a refusal of said first user.

According to at least one embodiment of the present disclosure, the method comprises ending said selection period upon capturing at least one ending order of at least one already selected user.

According to at least one embodiment of the present disclosure, said ending order is identified by taking account of an occurrence of a third action pattern in said tracked actions of said first user.

According to at least one embodiment of the present disclosure, the method comprises, when said electronic device is already configured in said multi-user mode, upon receiving a selecting request of a candidate user during said selection period, adding said candidate user in said group of tracked users according to a confirmation and/or a refusal of a first user of said group of tracked users.

According to at least one embodiment of the present disclosure, the method comprises, upon receiving a selecting request of a candidate user for configuring said electronic device in said mono-user mode, when said selection period has ended, configuring said electronic device in said mono-user mode, said candidate user being the single user controlling said electronic device.

According to at least one embodiment of the present disclosure, the method comprises upon receiving a selecting request of a candidate user for configuring said electronic device in said multi-users mode, when said selection period has ended, configuring said electronic device in said multi-user mode, said electric device being controlled by a new group of tracked users, including said candidate user, and starting a new selection period for adding other users to said new group.

According to at least one embodiment of the present disclosure, said configuring is performed upon obtaining a confirmation of at least one of said tracked user currently controlling said electronic device.

According to at least one embodiment of the present disclosure, said confirmation and/or refusal is identified by taking account of an occurrence of a fourth action pattern in said tracked actions of said first user.

According to at least one embodiment of the present disclosure, the method comprises determining a capturable signature uniquely identifying one of said tracked users.

According to at least one embodiment of the present disclosure, said first, second, third and/or fourth action pattern belongs to a group comprising:
  at least one sound sequence;
  at least one motion of at least one physical object;
  at least one motion of a human body;
  at least one pose of a human body;
  at least one pose of a physical object;
  at least one orientation of a physical object;
  a combination thereof.

According to at least one embodiment of the present disclosure, said at least one sensor belongs to a group comprising:
  a colorimetry camera;
  a depth camera;
  a microphone;
  a gyroscope;
  an accelerometer;
  a GPS module.

According to another aspect, the present disclosure relates to an electronic device comprising at least one processor, or at least one processing circuitry, being adapted for being configured in a mono user mode, where the electronic device is controlled by input elements obtained from a single tracked user, and in a multi-user mode where the electronic device is controlled by input elements obtained from a group or one or more tracked users, comprising at least one processor adapted for:
  tracking actions of at least one user, the at least one tracked user being selected amongst candidate users according to a current mode of said electronic device, and to selection requests of said candidate users, said selection requests being captured by at least one sensor coupled to said electronic device;
  determining at least one input element adapted for controlling said electronic device according to said tracked actions.

The present disclosure also relates to an electronic device adapted to be configured in a mono user mode, where the electronic device is controlled at least partially by input elements obtained by tracking a single user, and in a multi-user mode where the electronic device is controlled at least partially by input elements obtained by tracking one or more users, the electronic device comprising at least one processor adapted for:
  selecting a current mode of said electronic device and the at least one tracked user according to at least one selection request, selection requests of candidate users being captured by at least one sensor coupled to said electronic device during a selection period of finite duration.

While not explicitly described, the above electronic device of the present disclosure can be adapted to perform any embodiment of the above methods of the present disclosure.

According to another aspect, the present disclosure relates to a communication system comprising one or more electronic devices adapted for being configured in a mono user mode, where the electronic device is controlled by input elements obtained from a single tracked user, and in a multi-user mode where the electronic device is controlled by input elements obtained from a group or one or more tracked users, the one or more electronic devices comprising at least one processor, or at least one processing circuitry, adapted for:
  tracking actions of at least one user, the at least one tracked user being selected amongst candidate users according to a current mode of said electronic device, and to selection requests of said candidate users, said selection requests being captured by at least one sensor coupled to said electronic device;
  determining at least one input element adapted for controlling said electronic device according to said tracked actions.

The present disclosure also relates to a communication system comprising one or more electronic devices adapted to be configured in a mono user mode, where the electronic device is controlled at least partially by input elements obtained by tracking a single user, and in a multi-user mode where the electronic device is controlled at least partially by input elements obtained by tracking one or more users, the one or more electronic devices comprising at least one processor, or at least one processing circuitry, adapted for:
  selecting a current mode of said electronic device and the at least one tracked user according to at least one selection request, selection requests of candidate users being captured by at least one sensor coupled to said electronic device during a selection period of finite duration.

While not explicitly described, the present embodiments related to the methods or to the corresponding electronic devices or communication system can be employed in any combination or sub-combination.

According to another aspect, the present disclosure relates to a non-transitory computer readable program product comprising program code instructions for performing, when the non-transitory computer readable program product is executed by a computer, any embodiment of methods of the present disclosure.

For example, at least one embodiment of the present disclosure relates to a non-transitory computer readable program product comprising program code instructions for performing, when the non-transitory computer readable program product is executed by a computer, a method, implemented in an electronic device adapted to be configured in a mono user mode, where the electronic device is controlled by input elements obtained from a single tracked user, and in a multi-user mode where the electronic device is controlled by input elements obtained from a group or one or more tracked users, the method comprising:

tracking actions of at least one user, the at least one tracked user being selected amongst candidate users according to a current mode of said electronic device, and to selection requests of said candidate users, said selection requests being captured by at least one sensor coupled to said electronic device;

determining at least one input element adapted for controlling said electronic device according to said tracked actions.

At least one embodiment of the present disclosure relates to a non-transitory computer readable program product comprising program code instructions for performing, when the non-transitory readable program product is executed by a computer, a method, implemented in an electronic device adapted to be configured in a mono user mode, where the electronic device is controlled by input elements obtained from a single tracked user, and in a multi-user mode where the electronic device is controlled by input elements obtained from a group or one or more tracked users, a current mode of said electronic device and the at least one tracked user being selected according to at least one selection request, selection requests of candidate users being captured by at least one sensor coupled to said electronic device during a selection period of finite duration.

According to another aspect, the present disclosure relates to a computer readable storage medium carrying a non-transitory software program comprising program code instructions for performing, when the non-transitory software program is executed by a computer, any embodiment of the methods of the present disclosure.

According to an embodiment of the present disclosure, the computer readable storage medium tangibly embodies a non-transitory software program comprising program code instructions executable by a computer for performing, when the non-transitory software program is executed by a computer, a method, implemented in an electronic device adapted to be configured in a mono user mode, where the electronic device is controlled by input elements obtained from a single tracked user, and in a multi-user mode where the electronic device is controlled by input elements obtained from a group or one or more tracked users, the method comprising:

tracking actions of at least one user, the at least one tracked user being selected amongst candidate users according to a current mode of said electronic device, and to selection requests of said candidate users, said selection requests being captured by at least one sensor coupled to said electronic device;

determining at least one input element adapted for controlling said electronic device according to said tracked actions.

According to an embodiment of the present disclosure, the non-transitory computer readable storage medium carries a non-transitory software program comprising program code instructions executable by a computer for performing, when the software program is executed by a computer, a method, implemented in an electronic device adapted to be configured in a mono user mode, where the electronic device is controlled by input elements obtained by tracking a single user, and in a multi-user mode where the electronic device is controlled by input elements obtained by tracking a group or one or more users, a current mode of said electronic device and the at least one tracked user being selected according to at least one selection request, selection requests of candidate users being captured by at least one sensor coupled to said electronic device during a selection period of finite duration.

As can be appreciated by one skilled in the art, aspects of the present principles can be embodied as a system, method, or computer readable medium. Accordingly, aspects of the present disclosure can take the form of a hardware embodiment, a software embodiment (including firmware, resident software, micro-code, and so forth), or an embodiment combining software and hardware aspects that can all generally be referred to herein as a "circuit", "module" or "system". Furthermore, aspects of the present principles can take the form of a computer readable storage medium. Any combination of one or more computer readable storage medium may be utilized.

A computer readable storage medium can take the form of a computer readable program product embodied in one or more computer readable medium and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing.

It is to be appreciated that the following, while providing more specific examples of computer readable storage media to which the present principles can be applied, is merely an illustrative and not exhaustive listing as is readily appreciated by one of ordinary skill in the art: a portable computer diskette, a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

Thus, for example, it can be appreciated by those skilled in the art that the block diagrams presented herein represent conceptual views of illustrative system components and/or circuitry of some embodiments of the present principles. Similarly, it can be appreciated that any flow charts, flow diagrams, state transition diagrams, pseudo code, and the like represent various processes which may be substantially represented in computer readable storage media and so executed by a computer or processor, whether such computer or processor is explicitly shown.

It is also to be pointed out that the at least some of embodiments can be combined together, even if not explicitly disclosed above.

The present disclosure is not merely an abstract idea of identifying users and assigning users to certain modes as could be accomplished by the human mind. Instead the disclosure includes a practical application that transforms a sequence of sounds or a spatial relationship/orientation of an object (such as a part of a human body) into a mode of operation of a machine and/or a request for controlling the machine, select users to be tracked by at least one sensor coupled to the machine and control the machine according to an input element determined from actions of the tracked users. For instance, the practical application can modify a rendering of a virtual scene by a rendering device according a determined input element.

The invention claimed is:

1. An electronic device:
    wherein the electronic device is adapted to be configured in a mono-user mode, where the electronic device is controlled at least partially by captured physical actions of at least one tracked input element obtained by tracking a single user, and in a multi-user mode where the electronic device is controlled at least partially by captured physical actions of tracked input elements obtained by tracking a group of tracked users comprising two or more users manipulating different tracked input elements,
    wherein user tracking is performed with one or more sensing devices coupled to the electronic device,
    wherein said tracked input elements correspond to tracked physical objects or parts of the user's body, the electronic device comprising at least one processor configured to:
    select at least one tracked candidate user and the mode of said electronic device to be the mono-user mode or the multi-user mode according to at least one selection request captured by the one or more sensing devices as performed by the at least one tracked candidate user, and
    when the mode of said electronic device is the multi-user mode, and upon receiving a selection request of a candidate user during a selection period, add said candidate user in said group of tracked users according to a confirmation of a first user of said group of tracked users;
    selection requests of candidate users being captured during said selection period of finite duration;
    wherein the at least one processor is further configured to end said selection period upon capturing a given action by a user of said group of tracked users.

2. The electronic device of claim 1, the at least one processor being configured to alter a rendering of a virtual scene output on a rendering device coupled to said electronic device according to said obtained at least one tracked input element.

3. The electronic device of claim 1, wherein said selection requests are identified as requests for configuring said electronic device in said mono-user mode or as requests for configuring said electronic device in said multi-user mode by taking account respectively of a similarity criterion between a first action pattern associated to said mono user mode and a second action pattern associated to said multi-user mode.

4. The electronic device of claim 1, wherein the at least one processor is configured to end said selection period upon selecting a first user for controlling said electronic device when the mode of said electronic device is said mono-user mode.

5. The electronic device of claim 1, wherein said given action is identified by taking account of an occurrence of a third action pattern in said tracked actions of said first user.

6. The electronic device of claim 1, wherein the at least one processor is configured to, upon receiving a selection request of a candidate user for configuring said electronic device in said mono-user mode, when said selection period has ended, configure said electronic device in said mono-user mode, said candidate user being the single user controlling said electronic device.

7. The electronic device of claim 1, wherein the at least one processor is configured to, upon receiving a selecting request of a candidate user for configuring said electronic device in said multi-user mode, when said selection period has ended, configure said electronic device in said multi-user mode, said electric device being controlled by a new group of tracked users, including said candidate user, and starting a new selection period for adding other users to said new group.

8. The electronic device of claim 1, wherein said configuring is performed upon obtaining a confirmation of at least one of said tracked user currently controlling said electronic device.

9. The electronic device of claim 4, wherein said confirmation is identified by taking account of an occurrence of a fourth action pattern in said tracked actions of said first user.

10. The electronic device of claim 1, wherein said at least one processor is configured to determine a capturable signature uniquely identifying one of said tracked users.

11. A method,
    the method being performed in an electronic device adapted to be configured in a mono-user mode, where the electronic device is controlled at least partially by captured physical actions of at least one tracked input element obtained by tracking a single user, and in a multi-user mode where the electronic device is controlled at least partially by captured physical actions of tracked input elements obtained by tracking a group of tracked users comprising two or more users manipulating different tracked input elements,
    wherein user tracking is performed with one or more sensing devices coupled to the electronic device,
    wherein said tracked input elements correspond to tracked physical objects or parts of the user's body,
    the method comprising selecting at least one tracked candidate user and the mode of said electronic device to be the mono-user mode or the multi-user mode according to at least one selection request captured by the one or more sensing devices as performed by the at least one tracked candidate user, and
    when the mode of said electronic device is the multi-user mode, and upon receiving a selection request of a candidate user during a selection period, adding said candidate user in said group of tracked users according to a confirmation of a first user of said group of tracked users; wherein selection requests of candidate users are captured during said selection period of finite duration, wherein the method further comprises:
    ending said selection period upon capturing a given action by said first user of said group of tracked users.

12. The method of claim 11, further comprising altering a rendering of a virtual scene output on a rendering device coupled to said electronic device according to said obtained at least one tracked input element.

13. The method of claim 11, wherein said selection requests are identified as requests for configuring said electronic device in said mono-user mode or as requests for configuring said electronic device in said multi-user mode by taking account respectively of a similarity criterion between a first action pattern associated to said mono user mode and a second action pattern associated to said multi-user mode.

14. The method of claim 11, further comprising ending said selection period upon selecting a first user for controlling said electronic device when the mode of said electronic device is said mono-user mode.

15. The method of claim 11, wherein said given action is identified by taking account of an occurrence of a third action pattern in said tracked actions of said first user.

* * * * *